3,517,029
CYCLIC POLYMETHYLENE MONOTHIOL-
CARBONATES AND THEIR PREPARATION
Dee Lym Johnson, Rochester, N.Y., assignor to Eastman Kodak Company, Rochester, N.Y., a corporation of New Jersey
No Drawing. Filed Aug. 17, 1964, Ser. No. 390,213
Int. Cl. C07d 89/06
U.S. Cl. 260—327                              13 Claims

ABSTRACT OF THE DISCLOSURE

Cyclic polymethylene monothiolcarbonates and hydrocarbyl mercaptoalkylcarbonates are prepared by contacting a mercaptoalkanol with a carbonate diester in the presence of a catalytic amount of a catalytically active salt of thorium. Novel compounds such as 5-(hydroxymethyl) ethylene monothiolcarbonate, trimethylene monothiolcarbonate and tetramethylene monothiolcarbonate are obtained.

---

This invention relates to a novel chemical process and more particularly to a novel process for preparing cyclic polymethylene monothiolcarbonates and hydrocarbyl mercaptoalkylcarbonates. My invention also relates to certain novel cyclic polymethylene monothiolcarbonates.

In accordance with the process of my invention, cyclic polymethylene monothiolcarbonates and hydrocarbyl mercaptoalkylcarbonates are prepared by contacting a mercaptoalkanol in which the hydroxy group and the mercapto group are separated by at least 2 carbon atoms with a carbonate diester in the presence of a catalytic amount of a catalytically active salt of thorium. The process of my invention is made possible by my discovery that salts of thorium catalyze the reaction of such mercaptoalkanols and carbonate diesters to form cyclic polymethylene monothiolcarbonates and hydrocarbyl mercaptoalkylcarbonates without the formation of polymeric materials.

The chemical reactions occurring during the process of my invention can be represented by the following equations illustrating the use of certain preferred reactants:

(I)
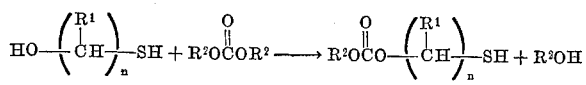

(II)
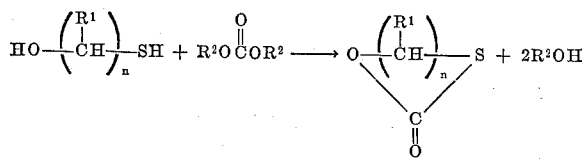

In the formulae for the preferred reactants in the above equations, $R^1$ can be hydrogen, alkyl, or hydroxymethyl; $R^2$ can be lower alkyl or mononuclear carbocyclic aryl and $n$ is an integer from 2 to about 4. $R^1$, when alkyl, is typically alkyl of up to about 18 carbon atoms and is preferably lower alkyl, e.g., methyl, ethyl, propyl, isopropyl, butyl, isobutyl, sec-butyl, tert-butyl, etc. $R^2$, when mononuclear carbocyclic aryl, is typically phenyl, tolyl, xylyl, etc., and is preferably phenyl and, when lower alkyl, is preferably methyl or ethyl.

Examples of some of the mercapto alkanols preferred for use in the process of my invention include 2-mercaptoethanol;
2-mercaptopropanol;
2-mercapto-1-methylethanol;
1-ethyl-2-mercaptobutanol;
1-butyl-2-mercaptoethanol;
2-mercaptoheptanol;
3-mercaptopropanol;
3-mercapto-1-methylpropanol;
2-(mercaptomethyl)butanol;
3-mercaptohexanol;
1,2-diethyl-3-mercaptopentanol;
3-mercaptooctanol;
4-mercaptobutanol;
1-ethyl-4-mercaptobutanol;
4-mercapto-2-methylbutanol;
3-(mercaptomethyl)hexanol;
4-mercaptopentanol;
2-ethyl-4-mercaptohexanol;
4-mercapto-1-methylpentanol;
4-mercapto-1,2,3-trimethylpentanol;
3-(mercaptomethyl)octanol;
1-(hydroxymethyl)-2-mercaptoethanol;
2-(hydroxymethyl)-3-mercaptopropanol;
2-(hydroxymethyl)-4-mercaptobutanol; etc.

Examples of some of the carbonate diesters preferred for use in the process of my invention include compounds such as dimethyl carbonate; diethyl carbonate; dipropyl carbonate; diisopropyl carbonate; dibutyl carbonate; diisobutyl carbonate; dipentyl carbonate; diphenyl carbonate; etc.

The contacting of the mercaptoalkanol and the carbonate diester is preferably carried out at atmospheric pressure for reasons of convenience. However, the process of my invention can be carreid out at subatmospheric or superatmospheric pressure. The reaction is preferably carried out in the liquid phase and the reaction temperature is therefore generally between the freezing point and the boiling point of the reaction mixture. When the cyclic polymethylene monothiolcarbonate is desired as the main reaction product, the reaction mixture is preferably heated at its boiling point. Higher yields of the hydrocarbyl mercaptoalkylcarbonates are obtained if the reaction temperature is below the boiling point of the reaction mixture, e.g., about 90–100° C. An especially preferred method of carrying out the process of my invention, particularly when maximum yields of the cyclic polymethylene monothiolcarbonate are desired, which is useful when the hydroxy compound produced during the course of the reaction has the lowest boiling point of the reactants and products, is to heat the reaction mixture at its boiling point and remove the hydroxy compound as it is formed. The removal of one of the products of the reaction in this manner tends to force the reaction to completion and thus gives the cyclic polymethylene monothiolcarbonate in higher yields.

Since the mercaptoalkanol and the carbonate diester react in equimolar proportions, it is generally preferred to employ approximately equimolar amounts of reactants. However, a stoichiometric excess of either the mercaptoalkanol or the carbonate diester can be employed and is often preferred.

The amount of the catalytically active salt of thorium employed in the process of my invention can be varied and will be referred to herein as a catalytic amount. In general, I employ about $2 \times 10^{-5}$ to about $500 \times 10^{-5}$ mole of catalytically active salt of thorium per expected mole of sulfur-containing product. A preferred range of catalyst concentration is from about $10 \times 10^{-5}$ to about $200 \times 10^{-5}$ mole of catalyst per expected mole of sulfur-containing product. In the foregoing, the phrase "expected mole of sulfur-containing product" means the theoretical amount of sulfur-containing product, i.e., cyclic polymethylene monothiolcarbonate or hydrocarbyl mercaptoalkylcarbonate, obtained from the reactants, e.g., 3 moles of a carbonate diester reacted with 2 moles of a mercaptoalkanol would be expected to give 2 moles of sulfur-containing product.

Examples of the useful catalytically active salts of thorium include thorium nitrate, thorium carbonate, thorium acetyl acetonate, thorium chloride, thorium sulfate, thorium oxalate, thorium acetate, thorium stearate, etc.

The production of the cyclic polymethylene monothiolcarbonate is enhanced by the use of relatively high reaction temperatures and relatively high catalyst concentrations within the ranges stated hereinbefore whereas the amount of hydrocarbyl mercaptoalkylcarbonate produced is increased by the use of relatively lower temperatures and relatively lower catalyst concentration within the stated ranges.

The reaction time can be widely varied and depends, in general, upon the reactivity of the reactants. Maximum yields of the cyclic polymethylene monothiolcarbonate are obtained if the reaction is allowed to run until 2 moles of hydroxy compound per expected mole of sulfur-containing product are produced whereas maximum yields of hydrocarbyl mercaptoalkyl-carbonate are obtained if the reaction is stopped after 1 mole of hydroxy compound per mole of sulfur-containing product has been produced.

The following examples illustrate the process of my invention.

EXAMPLE 1

Ethylene monothiolcarbonate

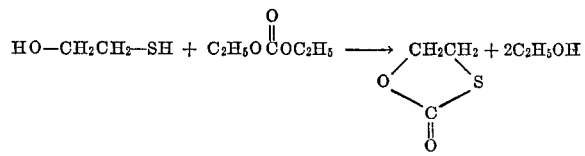

Three moles (234 g.) of 2-mercaptoethanol, 4 moles of diethyl carbonate (480 g.), and 0.2 g. ($4.25 \times 10^{-5}$ mole) of thorium nitrate were placed in a one-liter flask. This solution was magnetically stirred and refluxed at atmospheric pressure under a 14-inch glass helices packed column equipped with a solenoid actuated distillation head. The still head was controlled by a Thermocap relay (Niagra Electronics Corporation) to remove distillate below 79° (ethanol).

After 20 hours' operation about 345 g. of distillate had been removed. The system was placed under reduced pressure and ethylene monothiolcarbonate was collected (215 g., 70 percent yield, $n_D^{25}$ 1.5100, B.P., 108°/13 mm.).

EXAMPLE 2

Ethylene monothiolcarbonate

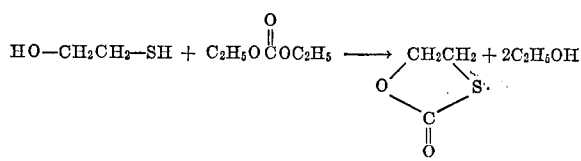

Ethylene monothiolcarbonate was prepared according to the procedure of Example 1 by contacting 72 moles (5,616 g.) of 2-mercaptoethanol with 97 mole (11,520 g.) of diethyl carbonate in the presence of 5.6 g. ($1.18 \times 10^{-2}$ mole) of thorium nitrate. The reaction produced 5,570 g. (74.3 percent) of ethylene monothiolcarbonate.

Similar results have been obtained using dimethyl carbonate as the carbonate diester.

EXAMPLE 3

Ethylene monothiolcarbonate

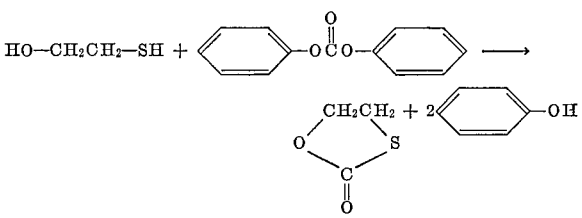

Two moles (418 g.) of diphenyl carbonate and 2 moles (152 g.) of 2-mercaptoethanol were placed in a one-liter flask and heated to 150° under atmospheric pressure to remove moisture in the reagents. To this solution was added 0.1 g. ($2.13 \times 10^{-4}$ mole) of thorium nitrate and the reaction heated to 180°. Through a 10-inch packed column was distilled 265 g. of phenol, $n_D^{25}$ 1.543. The distillation flask at this time contained 195 g. of material which, by vapor phase analysis on a silicon-gum-rubber column held isothermal at 100° (F and M 720 chromatograph), was shown to contain 50 percent phenol and 50 percent ethylene monothiolcarbonate, or 46.7 percent yield. This mixture was chilled to allow the phenol to crystallize and be collected by vacuum filtration. Isolation by distillation gave 63 g. (31 percent) ethylene monothiolcarbonate.

EXAMPLE 4

Trimethylene monothiolcarbonate

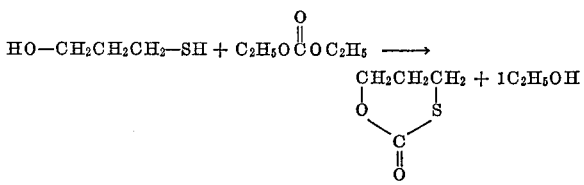

Into a 500 ml. flask were placed 75 g. (0.83 mole) 3-mercaptopropanol and 100 g. (0.84 mole) diethylcarbonate with 0.2 g. ($4.25 \times 10^{-4}$ mole) thorium nitrate. This solution was magnetically stirred and boiled at atmospheric pressure under a 12-inch glass helices packed column equipped with a solenoid actuated distillation head. The still held was controlled by a Thermocap Relay to remove distillate below 79°. After 18 hours' operation the product was isolated by vacuum distillation, B.P., 134°/7 microns, $n_D^{25}$ 1.502.

EXAMPLE 5

Tetramethylene monothiolcarbonate

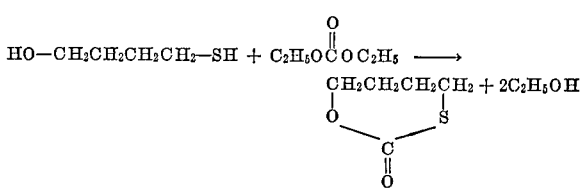

Into an apparatus such as that of Example 4 was placed 97 g. (0.91 mole) 4-mercaptobutanol, 145 g. (1.2 mole) diethylcarbonate and 0.4 g. ($8.5 \times 10^{-4}$ mole) thorium nitrate. The solution was boiled 48 hours to a pot temperature of about 190° while ethanol was collected at the still head. The product was isolated by vacuum distillation, B.P., 124°/4 microns, $n_D^{25}$ 1.496.

EXAMPLE 6

Ethyl 2-mercaptoethylcarbonate $$HO-CH_2CH_2-SH + C_2H_5O\overset{\overset{O}{\|}}{C}OC_2H_5 \longrightarrow$$

$$C_2H_5O\overset{\overset{O}{\|}}{C}O-CH_2CH_2-SH + C_2H_5OH$$

In a 500 ml flask fitted with a reflux condenser was placed 256 g. (2.2 mole) diethyl carbonate, 156 g. (2 moles) 2-mercaptoethanol and 0.2 g. ($4.25 \times 10^{-4}$ mole) thorium nitrate. This solution was heated on a steam bath 3 days at which time the condenser was replaced with a 14-inch glass helices packed column and a variable reflux ratio distillation head. Upon distillation the product was obtained with B.P. 81°/12 mm., $n_D^{25}$ 1.458, infrared spectrum a close match for the spectrum of an authentic sample.

EXAMPLE 7

Ethylene monothiolcarbonate $$HO-CH_2CH_2-SH + C_3H_7O\overset{\overset{O}{\|}}{C}OC_3H_7 \longrightarrow \underset{\underset{O}{\overset{\|}{C}}}{\overset{CH_2CH_2}{O \diagdown \diagup S}} + 2C_3H_7OH$$

Into an apparatus such as that of Example 4 was placed 292 g. (2 moles) dipropyl carbonate, 156 g. (2 moles) 2-mercaptoethanol and 0.1 g. ($2.13 \times 10^{-4}$ mole) thorium nitrate. The solution was boiled 20 hours to remove n-propanol and the product isolated by vacuum distillation B.P. 100°/14 mm., $n_D^{25}$ 1.5103, infrared a good match to authentic material.

EXAMPLE 8

Ethylene monothiolcarbonate $$HO-CH_2CH_2-SH + C_3H_7O\overset{\overset{O}{\|}}{C}OC_3H_7 \longrightarrow \underset{\underset{O}{\overset{\|}{C}}}{\overset{CH_2CH_2}{O \diagdown \diagup S}} + 2C_3H_7OH$$

Using thorium acetylacetonate (0.2 g.) and the procedure of Example 7, ethylene monothiolcarbonate was obtained, B.P. 92°/11 mm., $n_D^{25}$ 1.5104.

EXAMPLE 9

5-(hydroxymethyl)ethylene monothiolcarbonate $$HO-\overset{\overset{CH_2OH}{|}}{C}H_2CH_2-SH + C_2H_5O\overset{\overset{O}{\|}}{C}OC_2H_5 \longrightarrow \underset{\underset{O}{\overset{\|}{C}}}{\overset{\overset{CH_2OH}{|}}{CH}-\overset{|}{C}H_2}_{O \diagdown \diagup S} + 2C_2H_5OH$$

Into an apparatus such as that of Example 4 was placed 108 g. (1 mole) 3-mercapto-1,2-propanediol, 140 g. (1.2 mole) diethyl carbonate and 0.2 g. ($4.25 \times 10^{-4}$ mole) thorium nitrate. This mixture was heated 42 hours as ethanol was removed. The product was isolated by vacuum distillation, B.P. 115°/0.1 mm., $n_D^{25}$ 1.521.

Also included within my invention are the novel compounds 5-(hydroxymethyl)ethylene monothiolcarbonate, trimethylene monothiolcarbonate and tetramethylene monothiolcarbonate. These compounds are useful in the preparation of cyclic sulfides. Thus, cyclic sulfides can be prepared by heating the novel compounds of my invention to their decomposition temperature. The compound 5-(hydroxymethyl)ethylene monothiolcarbonate, when heated to its decomposition temperature yields, (hydroxymethyl)ethylene sulfide. Trimethylene monothiolcarbonate and tetramethylene monothiolcarbonate, when heated to their decomposition temperature, yield thietane and tetrahydrothiophene, respectively.

Although the invention has been described in considerable detail with particular reference to certain preferred embodiments thereof, variations and modifications can be effected within the spirit and scope of the invention as described hereinabove, and as defined in the appended claims.

I claim:

1. The process which comprises contacting a carbonate diester with a mercaptoalkanol, the hydroxy group and the mercapto group of which are separated by at least two carbon atoms, in the presence of a catalytic amount of a catalytically active salt of thorium.

2. The process of claim 1 in which a mixture containing the carbonate diester, the mercaptoalkanol and the catalytically active salt of thorium is heated at its boiling point.

3. The process which comprises contacting a mercaptoalkanol of the formula:

$$HO-\left(\overset{\overset{R^1}{|}}{C}H\right)_n-SH$$

with a carbonate diester of the formula:

$$R^2O-\overset{\overset{O}{\|}}{C}-OR^3$$

in the presence of a catalytic amount of a catalytically active salt of thorium; wherein each of the substituents $R^1$ is selected from the group consisting of:
 (a) hydrogen,
 (b) alkyl, and
 (c) hydroxymethyl;
each of the substituents $R^2$ is selected from the group consisting of:
 (a) lower alkyl and
 (b) mononuclear carbocyclic aryl
and $n$ is an integer from 2 to about 4.

4. The process of claim 3 in which a mixture containing the mercaptoalkanol, the carbonate diester and the catalytically active salt of thorium is heated at its boiling point.

5. The process which comprises heating, at its boiling point, a mixture containing a mercaptoalkanol of the formula:

$$HO-\left(\overset{\overset{R^1}{|}}{C}H\right)_n-SH$$

a carbonate diester of the formula:

$$R^2O-\overset{\overset{O}{\|}}{C}-OR^2$$

and a catalytic amount of a catalytically active salt of thorium selected from the group consisting of:
 (a) thorium nitrate,
 (b) thorium carbonate, and
 (c) thorium acetyl acetonate
and obtaining a cyclic polymethylene monothiolcarbonate of the formula:

$$O-\left(\overset{\overset{R^1}{|}}{C}H\right)_n-S \diagdown \diagup \underset{\underset{O}{\overset{\|}{C}}}{}$$

wherein each of the substituents R' is selected from the group consisting of:
 (a) hydrogen,
 (b) lower alkyl, and
 (c) hydroxymethyl;
each of the substituents $R^2$ is selected from the group consisting of:
 (a) lower alkyl and (b) mononuclear carbocyclic aryl and n is an integer from 2 to about 4.

6. The process which comprises heating a mixture containing 2-mercaptoethanol, diethyl carbonate, and thorium nitrate, and obtaining at least one product selected from the group consisting of:
 (a) ethylene monothiolcarbonate and
 (b) ethyl 2-mercaptoethylcarbonate.

7. The process which comprises heating a mixture containing 2-mercaptoethanol, diphenyl carbonate, and thorium nitrate, and obtaining at least one product selected from the group consisting of:
 (a) ethylene-monothiolcarbonate and
 (b) phenyl 2-mercaptoethylcarbonate.

8. The process which comprises heating a mixture containing 3-mercaptopropanol, diethyl carbonate, and thorium nitrate, and obtaining at least one product selected from the group consisting of:
 (a) trimethylene monothiolcarbonate and
 (b) ethyl 2-mercaptopropylcarbonate.

9. The process which comprises heating a mixture containing 4-mercaptobutanol, diethyl carbonate, and thorium nitrate, and obtaining at least one product selected from the group consisting of:
 (a) tetramethylene monothiolcarbonate and
 (b) ethyl 4-mercaptobutylcarbonate.

10. The process which comprises heating a mixture containing 2-mercaptoethanol, dipropyl carbonate, and thorium nitrate, and obtaining at least one product selected from the group consisting of:
 (a) ethylene monothiolcarbonate and
 (b) propyl 2-mercaptoethylcarbonate.

11. The process which comprises heating a mixture containing 2-mercaptoethanol, dipropyl carbonate, and thorium acetylacetonate, and obtaining at least one product selected from the group consisting of:
 (a) ethylene monothiolcarbonate and
 (b) propyl 2-mercaptoethylcarbonate.

12. The process which comprises heating a mixture containing 3-mercapto-1,2-propane diol, diethyl carbonate, and thorium nitrate, and obtaining at least one product selected from the group consisting of:
 (a) 5 - (hydroxymethyl)ethylene monothiolcarbonate, and
 (b) ethyl 1 - (hydroxymethyl)-2-mercaptoethylcarbonate.

13. The compound 5-(hydroxymethyl)ethylene monothiolcarbonate.

References Cited

UNITED STATES PATENTS 3,409,635  11/1968  DeBenneville et al. __ 260—327

JAMES A. PATTEN, Primary Examiner

U.S. Cl. X.R.

260—463

PO-1050
(5/69)

UNITED STATES PATENT OFFICE
CERTIFICATE OF CORRECTION

Patent No. 3517029        Dated 6/23/70

Inventor(s) Dee L. Johnson

It is certified that error appears in the above-identified patent and that said Letters Patent are hereby corrected as shown below:

In line 27, Column 6

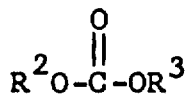

should read:

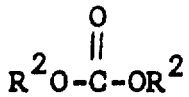

Column 1, line 4

Dee Lym Johnson, should read --

Dee Lynn Johnson

SIGNED AND SEALED
OCT 20 1970

(SEAL)
Attest:

Edward M. Fletcher, Jr.
Attesting Officer

WILLIAM E. SCHUYLER, JR.
Commissioner of Patents